(12) United States Patent
Yano

(10) Patent No.: US 7,261,419 B2
(45) Date of Patent: Aug. 28, 2007

(54) IMAGE DISPLAY APPARATUS

(75) Inventor: Tomoya Yano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/509,136

(22) PCT Filed: Mar. 19, 2003

(86) PCT No.: PCT/JP03/03327

§ 371 (c)(1),
(2), (4) Date: Sep. 27, 2004

(87) PCT Pub. No.: WO03/083572

PCT Pub. Date: Oct. 9, 2003

(65) Prior Publication Data

US 2005/0174750 A1 Aug. 11, 2005

(30) Foreign Application Priority Data

Mar. 29, 2002 (JP) ............................. 2002-098042

(51) Int. Cl.
*G03B 21/26* (2006.01)
*G03B 21/14* (2006.01)
*G03B 21/00* (2006.01)

(52) U.S. Cl. ............................. 353/30; 353/20; 353/33
(58) Field of Classification Search ................. 353/20, 353/31, 33, 99, 97, 81; 349/9
See application file for complete search history.

(56) References Cited

U.S. PATENT DOCUMENTS

| 5,073,013 A | * | 12/1991 | Sonehara et al. | 353/31 |
| 5,622,418 A | * | 4/1997 | Daijogo et al. | 353/97 |
| 6,547,396 B1 | * | 4/2003 | Svardal et al. | 353/8 |
| 6,626,540 B2 | * | 9/2003 | Ouchi et al. | 353/31 |
| 6,666,558 B1 | * | 12/2003 | Yamagishi et al. | 353/94 |
| 6,678,015 B2 | * | 1/2004 | Yi et al. | 348/782 |
| 6,899,430 B2 | * | 5/2005 | Johnson et al. | 353/31 |
| 2001/0021004 A1 | * | 9/2001 | Yano | 353/31 |
| 2005/0105059 A1 | * | 5/2005 | Newell et al. | 353/81 |

FOREIGN PATENT DOCUMENTS

| JP | 07-005419 | 1/1995 |
| JP | 2000-510961 | 8/2000 |
| JP | 2001-209007 | 8/2001 |
| JP | 2003-075769 | 3/2003 |
| WO | WO97/43862 | 11/1997 |

\* cited by examiner

*Primary Examiner*—Melissa Jan Koval
*Assistant Examiner*—Andrew Kong
(74) *Attorney, Agent, or Firm*—Robert J. Depke; Rockey, Depke & Lyons, LLC.

(57) ABSTRACT

The present invention relates to an image display apparatus including a plurality of spatial light modulation elements corresponding to respective colors and an illumination optical system illuminating the plural spatial light modulation elements. The image display apparatus includes a dichroic prism (5) which color-separates illumination light from an illumination optical system (2) to direct thus separated lights to respective spatial light elements (3R), (3G), (3B) as well as composites reflection lights from those spatial light elements (3R), (3G), (3B), and a projection lens (6) which projects the light outgoing from the dichroic prism (5) to display an image. A retarder stack (7), which is disposed on an optical path between the illumination optical system (2) and the dichroic prism (5), causes light of wavelength band which is supposed to pass through reflection planes of the dichroic prism (5) to be of P-polarized light, and causes light of wavelength band which is supposed to be reflected by the reflection planes to be of S-polarized light.

8 Claims, 9 Drawing Sheets

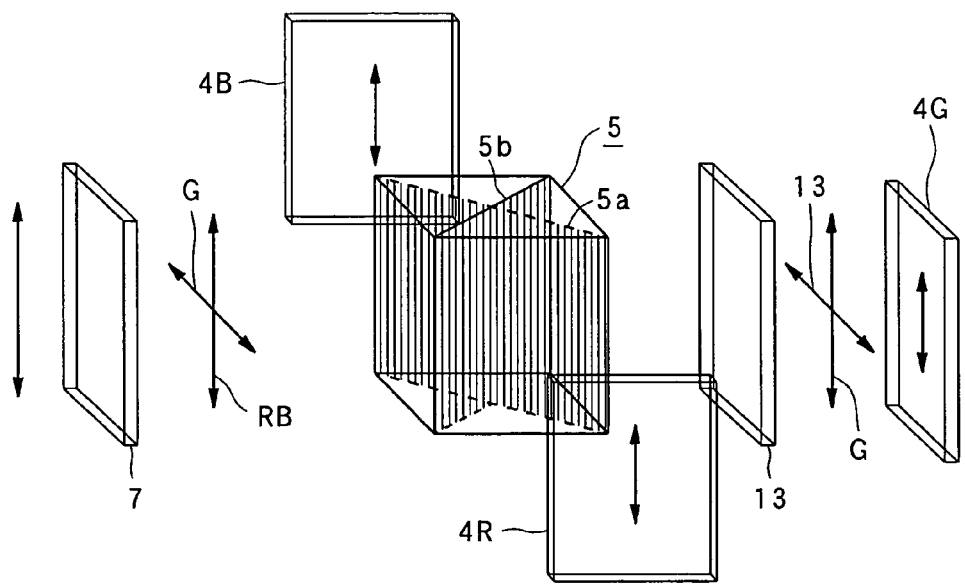
FIG. 9
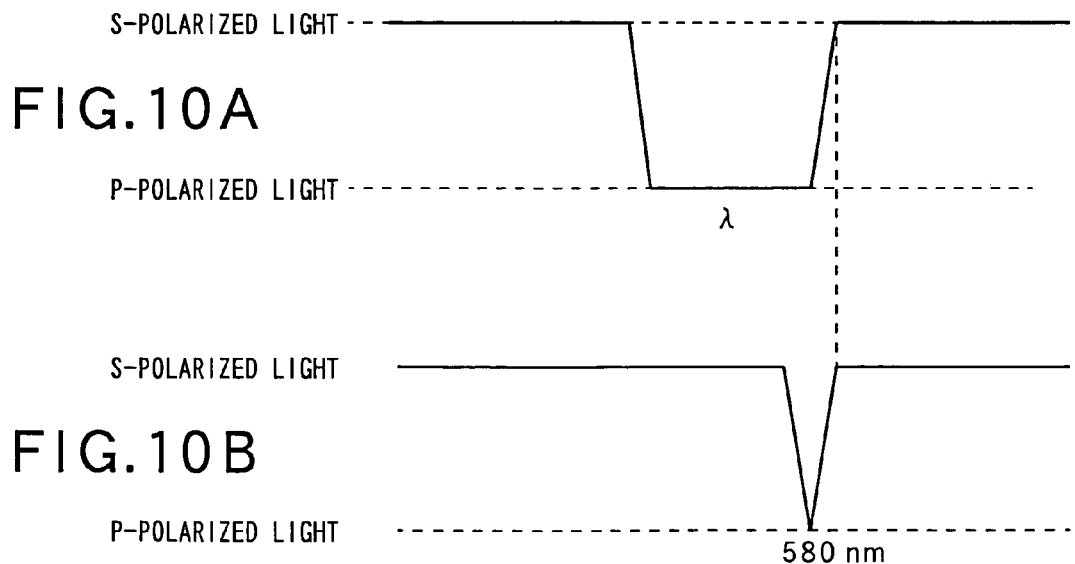
FIG.10A
FIG.10B

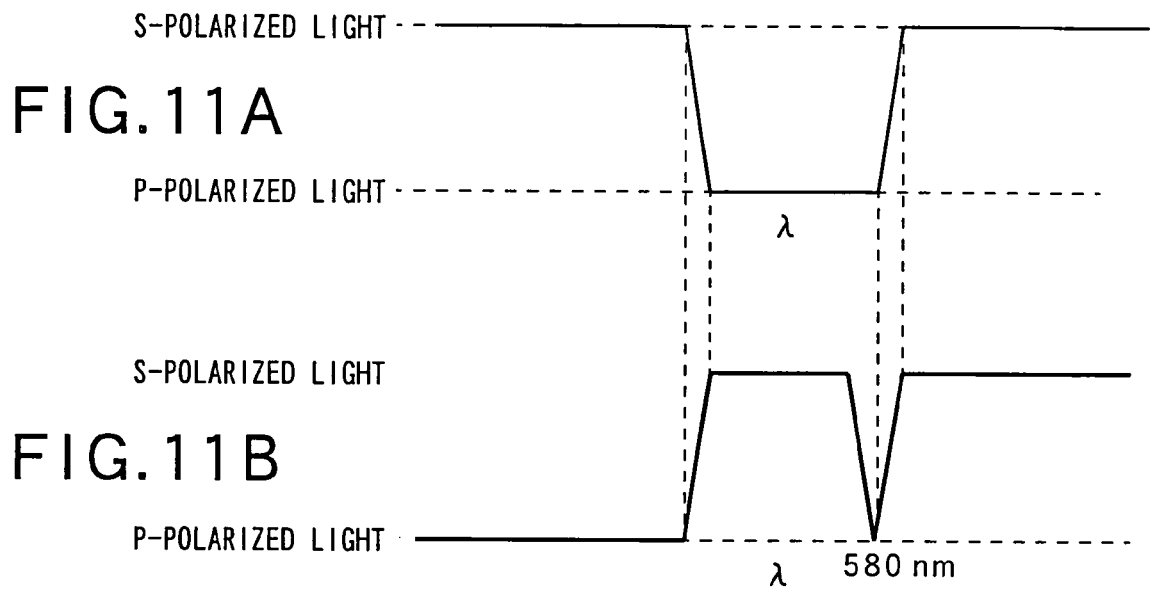

IMAGE DISPLAY APPARATUS

TECHNICAL FIELD

The present invention relates to an image display apparatus which modulates illumination light according to a predetermined image using spatial light modulation elements and projects thus modulated light to display the image.

This application claims priority to Japanese Patent Application Number JP2002-098042, filed Mar. 29, 2002 which is incorporated herein by reference.

BACKGROUND ART

Up to now, there has been proposed an image display apparatus which illuminates spatial light modulation elements utilizing polarization made of such as liquid crystal using an illuminator having a light source e.g. a discharge lamp, and projects an image of the spatial light modulation elements using a projection lens.

Such a projection-type image display apparatus has come into practical use, particularly as a large-sized image display apparatus. For example, in an image display apparatus which employs reflection-type liquid crystal elements having reflecting electrodes as spatial light modulation elements, the numerical aperture of the spatial light modulation elements can be enlarged to realize miniaturization of the configuration of the apparatus and high-definition image displaying.

The reflection-type spatial light modulation elements modulate polarization direction of incoming illumination light and reflect thus modulated light, according to an image to be displayed at respective pixels. Thus, when using reflection-type spatial light modulation elements, a polarizer which polarizes incoming light into the spatial light modulation elements and an analyzer which analyzes polarized components of predetermined direction alone from the light reflected by the spatial light modulation elements are necessary to be provided.

As the polarizer and analyzer, a polarization beam splitter (PBS) 101 can be used, as shown in FIG. 1. In the image display apparatus, illumination light emitted from a discharge lamp 102 outgoes from an illumination optical system 103 consisting of a parabolic mirror and a fly-eye lens, and comes into the polarization beam splitter 101 via a first condenser lens 104, a mirror 105 and a second condenser lens 106. The reflection plane of the polarization beam splitter 101, which is laid obliquely against the incoming illumination light, reflects S-polarized component alone of the incoming illumination light, and causes the S-polarized component to outgo to a dichroic prism 107 working as a color separation/composition element. Here, the polarization beam splitter 101 works as a polarizer.

The dichroic prism 107 separates the illumination light into R (red) light, G (green) light and B (blue) light, each of which comes into spatial light modulation elements 108, 109 and 110 corresponding to each color, respectively. The spatial light modulation elements 108, 109 and 110 modulate polarization directions of the separated color lights according to an image to be displayed. Then, thus modulated color lights are composited at the dichroic prism 107, and thus composited light returns to the polarization beam splitter 101. At this time, the polarization beam splitter 101 allows P-polarized component alone, toward the reflection plane, of the illumination light returned from the dichroic prism 107 to pass through the reflection plane, and causes the P-polarized component to outgo to a projection lens 111. Here, the polarization beam splitter 101 works as an analyzer for converting polarization modulation to intensity modulation.

The projection lens 111 projects the light of an image from the spatial light modulation elements 108, 109 and 110 onto a screen, not shown, to display an image.

In the image display apparatus described above, the reflection plane of the polarization beam splitter is made of dielectric multilayer films, which select polarized light in accordance with the difference of reflectance between P-polarized light and S-polarized light at respective interfaces of the dielectric multilayer films. Therefore, the reflection plane of the polarization beam splitter selects polarized light depending highly on wavelength and angle.

In the image display apparatus, when using bright illumination light of small F-number, the range of incident angle of illumination light toward the reflection plane of the polarization beam splitter becomes wide, which undesirably deteriorates the function of the polarization beam splitter as a polarizer. Namely, the image display apparatus employing the polarization beam splitter working as a polarizer as well as an analyzer cannot use bright illumination light, thus efficiency of light utilization in an illumination optical system can not be improved.

Also, separating color using a dichroic prism depends highly on polarization state. Namely, in the dichroic prism, the dichroic surface for separating color has different properties between for incoming light being S-polarized light and for outgoing light being P-polarized light. The polarization direction of the modulated light reflected by the spatial light modulation element is perpendicular to that of the incoming light, consequently, the efficiency of light utilization is deteriorated.

Further, in the case the dichroic surface is so constructed as to reflect R (red) light and B (blue) light of incoming S-polarized illumination light, G (green) light needs to pass through the dichroic surface. Generally, the dichotic surface has higher reflectance R (p) for S-polarized light as compared with reflectance R (s) for P-polarized light. Accordingly, actually, G (green) light component is also partially reflected to come into the spatial light modulation elements for R (red) light and B (blue) light, as shown in FIG. 2. The phenomenon described above consequently deteriorates color separation property and color reproduction property of an image to be displayed.

In case of using a light source of irregular emission spectrum distribution, illumination light of regular wavelength distribution may not be obtained. In this case, when the illumination light is separated into R (red) light, G (green) light and B (blue) light to be modulated and thus modulated lights are composited, desirable color reproduction range may not be obtained.

DISCLOSURE OF THE INVENTION

Accordingly, the present invention has an object to overcome the above-mentioned drawbacks of the prior art by providing a new image display apparatus.

Furthermore, the present invention has another object to provide an image display apparatus including a plurality of spatial light modulation elements and an illumination optical system which illuminate those spatial light modulation elements, which can realize desirable color separation property and color reproduction property.

The above object can be attained by provide an image display apparatus including:

an illumination optical system having a light source;

a plurality of spatial light modulation elements each having reflecting electrodes;

polarization elements corresponding to the plural spatial light modulation elements;

a color separation/composition element for color-separating illumination light from the illumination optical system into transmission light and reflection light to direct thus generated transmission light and reflection light to the respective spatial light modulation elements via the corresponding polarization elements and for compositing reflection lights from the spatial light modulation elements, the color separation/composition element having reflection planes laid obliquely against the illumination light where the illumination light is color-separated and the reflection lights are composited;

a projection optical system for projecting composited light outgoing from the color separation/composition element to display an image of the respective spatial light modulation elements; and a polarization change means for, of the illumination light, causing light of wavelength band which is supposed to pass through the reflection planes of the color separation/composition element to be of P-polarized light toward the reflection planes and causing light of wavelength band which is supposed to be reflected by the reflection planes of the color separation/composition element to be of S-polarized light toward the reflection planes, the polarization change means being disposed on an optical path between the illumination optical system and the color separation/composition element.

According to the image display apparatus, of illumination light, the polarization change means which is disposed on the optical path between the illumination optical system and the color separation/composition element causes light of wavelength band which is supposed to pass through the reflection planes of the color separation/composition element to be of P-polarized light toward the reflection planes, and causes light of wavelength band which is supposed to be reflected by the reflection planes of the color separation/composition element to be of S-polarized light toward the reflection planes, which can improve color separation property.

Furthermore, according to the image display apparatus, a second polarization change means for, of the illumination light, rotating polarization direction of light of wavelength band which is supposed to be blocked by the polarization element, is disposed on an optical path between the color separation/composition element and the polarization element corresponding to the spatial light modulation element.

According to the image display apparatus, of illumination light, the second polarization change means which is disposed on the optical path between the color separation/composition element and the polarization element corresponding to the spatial light modulation element rotates polarization direction of light of wavelength band which is supposed to be blocked by the polarization element, which can improve color reproduction property.

These objects and other objects, features and advantages of the present invention will become more apparent from the following detailed description of the preferred embodiments of the present invention.

BRIEF DESCRIPTION OF THE DRAWINGS

FIG. 9 shows a perspective view of the configuration of the principal part of the image display apparatus shown in FIG. 8.

FIG. 10A shows a graph of polarization state of illumination light which has passed through a first retarder stack, and FIG. 10B shows a graph of polarization state of illumination light which has passed through a second retarder stack of the image display apparatus shown in FIG. 8.

FIG. 11A shows a graph of polarization state of illumination light which has passed through a first retarder stack, and FIG. 11B shows a graph of another polarization state of illumination light which has passed through a second retarder stack of the image display apparatus shown in FIG. 8.

BEST MODE FOR CARRYING OUT THE INVENTION

The image display apparatus according to the present invention will be described in detail concerning the best modes for carrying out the present invention with reference to the accompanying drawings.

Figure 1:
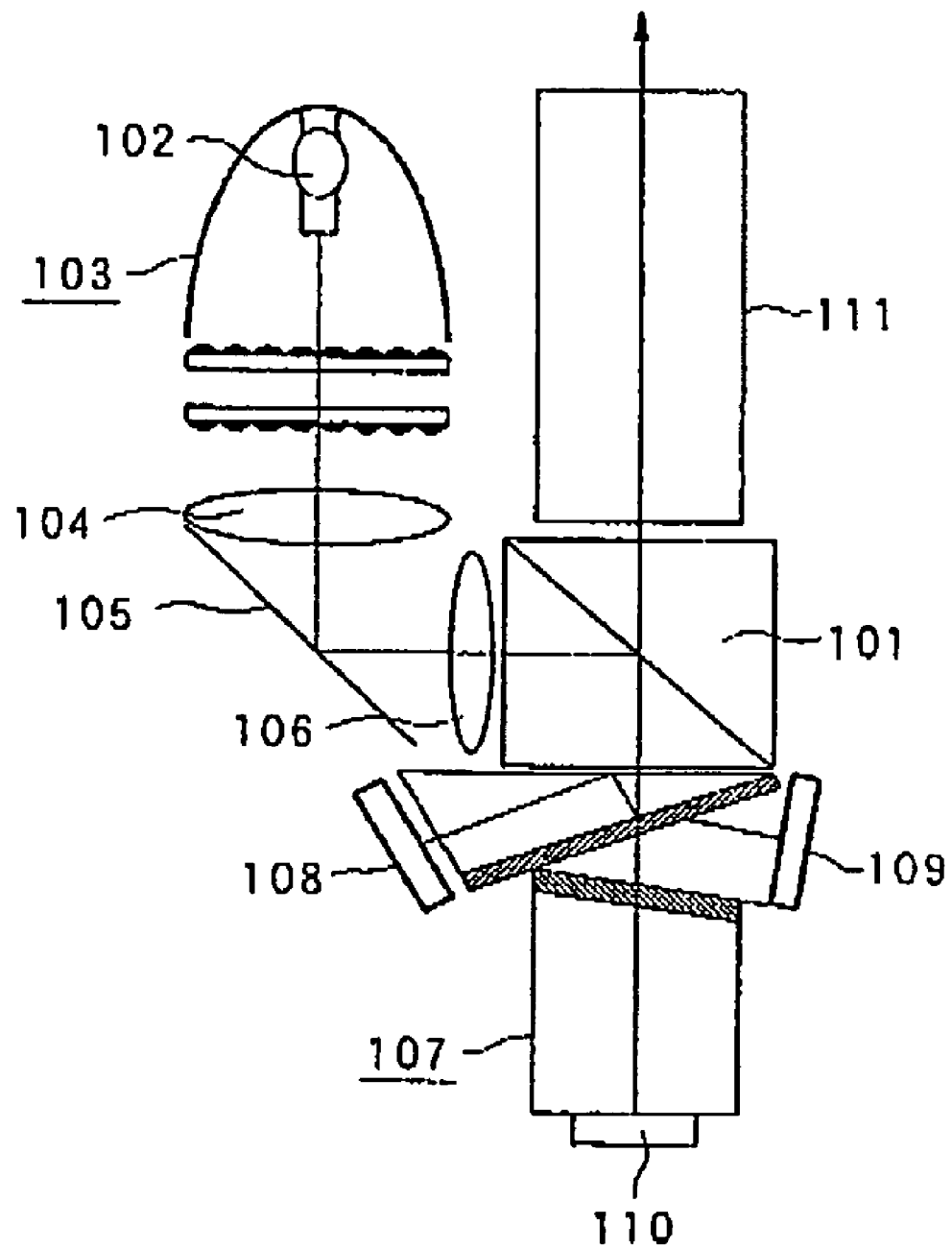
FIG. 1 shows a plan view of a conventional image display apparatus.
Figure 2:
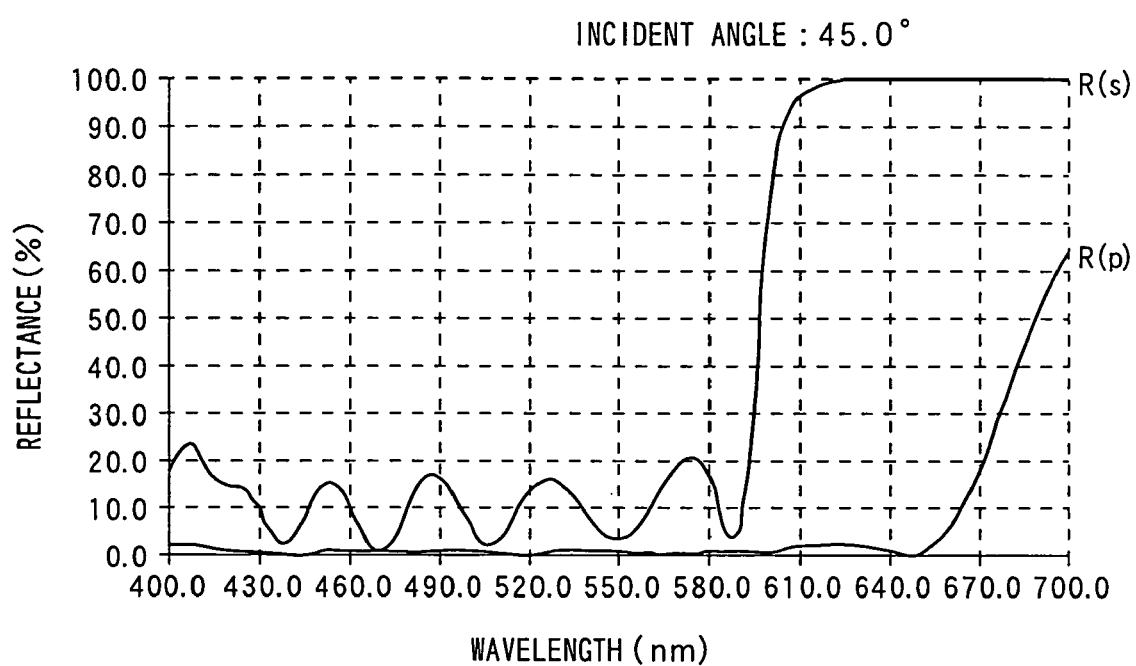
FIG. 2 shows a graph of the spectral property of a dichroic prism employed in a conventional image display apparatus.
Figure 3:
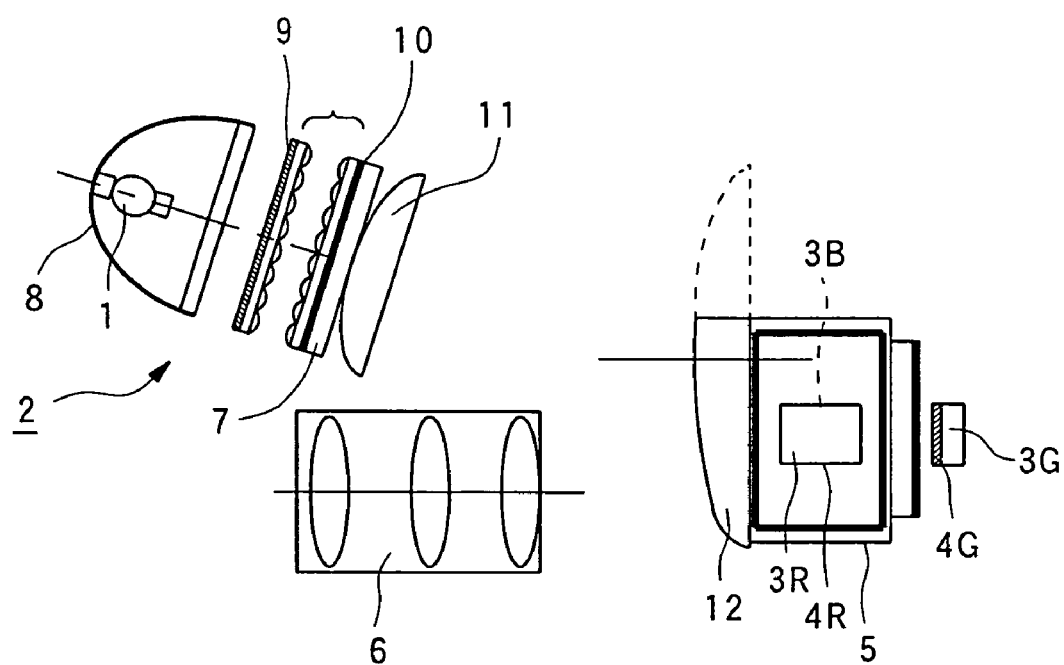
FIG. 3 shows a plan view of the configuration of an image display apparatus according to the present invention.

An image display apparatus according to the present invention includes an illumination optical system 2 having a light source 1, and three spatial light modulation elements 3R, 3G, and 3B which are illuminated by illumination light from the illumination optical system 2 and modulates the illumination light, as shown in FIG. 3. The light source 1 is, for example, UHP lamp (ultra-high pressure mercury lamp) etc. The illumination optical system 2 includes the light source 1, a parabolic mirror 8 which reflects the illumination light emitted from the light source 1 to make the illumination light approximately parallel light, a fly-eye lens 9 into which the light reflected by the parabolic mirror 8 comes, a polarizing plate 10, and a first condenser lens 11.

Figure 4:
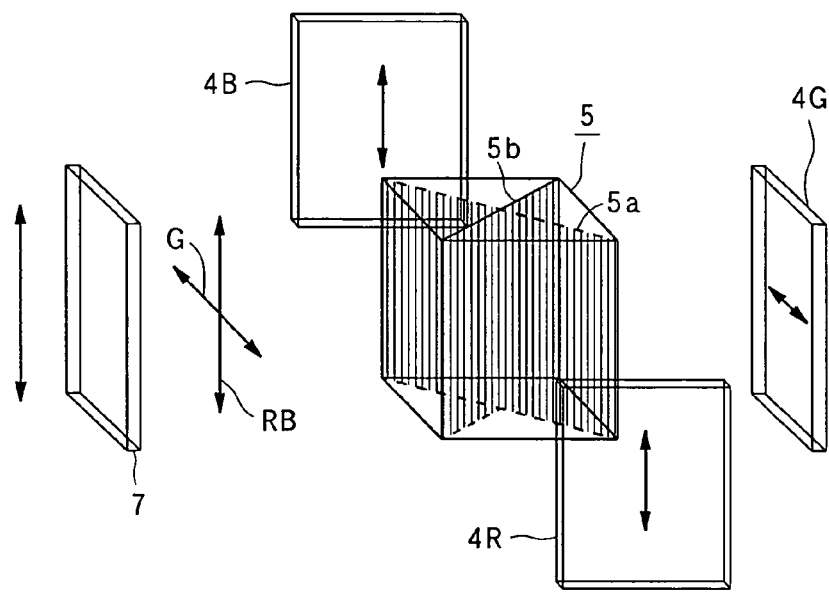
FIG. 4 shows a perspective view of the configuration of the principal part of the image display apparatus according to the present invention.
Figure 5:
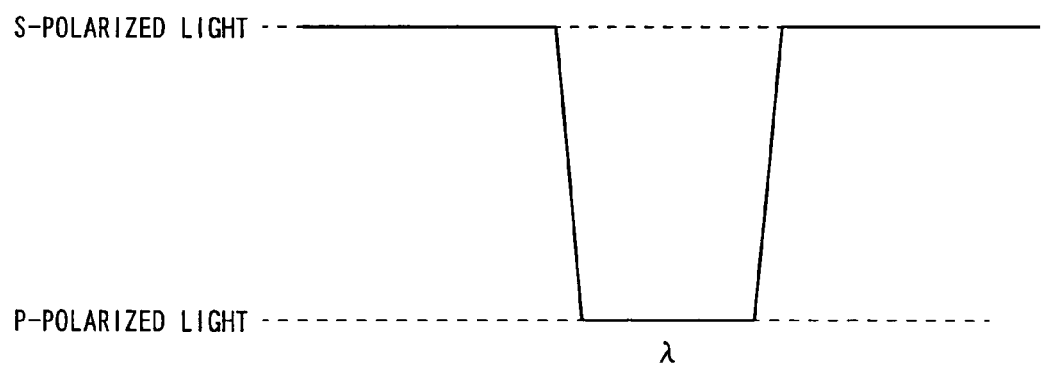
FIG. 5 shows a graph of polarization state of illumination light which has passed through a retarder stack of the image display apparatus according to the present invention.

Illumination light outgoing from the illumination optical system 2 passes through the polarizing plate 10 to be approximately linearly polarized light. The illumination light from the illumination optical system 2 comes into a second condenser lens 12 whose optical axis is directed obliquely against the illumination light, and then comes into a dichroic prism 5 working as a color separation/composition element. The dichroic prism 5 is configured in the form of a cubic shape, as shown in FIG. 4, and one plane thereof is an incidence plane into which illumination light comes. In the dichroic prism 5, three planes or a plane which faces and is parallel with the incidence plane and two planes which face each other and are perpendicular to the incidence plane are exit planes.

The dichroic prism 5 has a pair of reflection planes 5a, 5b which are perpendicular to each other and are laid obliquely against the incidence plane, into which the illumination light comes, by 45°. The reflection planes 5a, 5b are also laid obliquely against the three exit planes by 45°. The dichroic prism 5 is disposed such that the illumination light coming into the dichroic prism 5 is S-polarized light toward the reflection planes 5a, 5b. The reflection planes 5a, 5b are dielectric films, each of which reflects light of predetermined wavelength band and transmits light of other wavelength band. For example, one reflection plane 5a reflects light of wavelength band corresponding to R (red) light, and the other reflection plane 5b reflects light of wavelength band corresponding to B (blue) light. Light of wavelength band corresponding to R (red) light outgoes from a first exit plane which is perpendicular to the incident plane. Light of wavelength band corresponding to B (blue) light outgoes from a second exit plane which faces and is parallel with the first exit plane. Light of wavelength band corresponding to G (green) light passes through both reflection planes 5a, 5b and outgoes from a third exit plane which faces and is parallel with the incidence plane.

Thus, the dichroic prism 5 color-separates the illumination light into R (red) light, B (blue) light and G (green) light and causes thus separated lights to outgo into three directions respectively.

The three spatial light modulation elements 3R, 3G and 3B are reflection-type light valves each using a liquid crystal element having a reflecting electrode, and are so disposed as to face the respective three exit planes of the dichroic prism 5 correspondingly, as shown in FIG. 3. The spatial light modulation elements 3R, 3G and 3B has formed thereon polarization elements 4R, 4G and 4B which are so disposed as to be sandwiched between the exit planes of the dichroic prism 5 and the spatial light modulation elements 3R, 3G and 3B corresponding to the respective exit planes, as shown in FIG. 4. The polarization elements 4R, 4G and 4B are circular polarizing plates each of which consists of a linear polarizing plate facing the dichroic prism 5 and a quarter-wave plate layered on the linear polarizing plate. Note that, in FIG. 3, the polarization element 4R is disposed between the dichroic prism 5 and the spatial light modulation element 3R.

The R (red) light outgoing from the first exit plane of the dichroic prism 5 passes through the polarization element 4R to be circularly polarized light, and thus generated circularly polarized light comes into the spatial light modulation element 3R for R (red) light. The B (blue) light outgoing from the second exit plane of the dichroic prism passes through the polarization element 4B to be circularly polarized light, and thus generated circularly polarized light comes into the spatial light modulation element 3B for B (blue) light. The G (green) light outgoing from the third exit plane of the dichroic prism 5 passes through the polarization element 4G to be circularly polarized light, and thus generated circularly polarized light comes into the spatial light modulation element 3G for G (green) light.

The polarization elements 4R, 4B, into which R (red) light and B (blue) light come, transmit S-polarized light toward respective reflection planes 5a, 5b. Thus, ideally, the whole R (red) light and B (blue) light outgoing from the dichroic prism 5 pass through the polarization elements 4R, 4B and come into the spatial modulators 3R, 3B, respectively. Since the polarization direction of the G (green) light outgoing from the third exit plane of the dichroic prism 5 is changed by a retarder stack 7, which will be described later, the polarization direction of the G (green) light passing through the polarization element 4G is determined according to the property of changing polarization direction of the retarder stack 7.

The spatial light modulation elements 3R, 3G and 3B modulate polarization directions of the respective color lights coming thereinto, according to an image to be displayed at respective pixels, and reflects thus modulated lights.

Of components of the reflected lights from the spatial light modulation elements 3R, 3G and 3B, the polarization elements 4R, 4G and 4B block components which are modulated and whose polarization directions are changed, and transmit components which are not modulated to return them to the dichroic prism 5. The reflection planes 5a, 5b of the dichroic prism 5 composite the reflected lights returned from the spatial light modulation elements 3R, 3G and 3B, and cause thus composited light to outgo from the incidence plane of the dichroic prism 5. At this time, as shown in FIG. 3, since the illumination light from the illumination optical system 2 comes into the second condenser lens 12 whose optical axis is directed obliquely against the illumination light, the composited light outgoes along a direction opposite to that of the incoming light when viewed from the optical axis of the second condenser lens 12. Thus, the outgoing light does not return to the illumination optical system 2 but comes into a projection light 6 being a projection optical system.

The projection lens 6 projects the light outgoing from the dichroic prism 5 onto a screen, not shown, to display an image of the spatial light modulation elements 3R, 3G and 3B. Thus, a full color image is displayed on the screen.

The image display apparatus is provided with a retarder stack 7 working as a polarization change element on the optical path from the illumination optical system 2 to the dichroic prism 5. Of the illumination light from the illumination optical system 2, the retarder stack 7 causes light of wavelength band which is supposed to pass through the reflection planes 5a, 5b of the dichroic prism 5 to be of P-polarized light toward the reflection planes 5a, 5b, and causes light of wavelength band which is supposed to be reflected by the reflection planes 5a, 5b of the dichroic prism 5 to be of S-polarized light toward the reflection planes 5a, 5b.

Namely, the retarder stack 7 is so configured as to rotate polarization direction of λ light wavelength band corresponding to G (green) light alone by 90°. The reflection wavelength band of the reflection planes 5a, 5b of the dichroic prism 5 is set corresponding to the property of the retarder stack 7. That is, wavelength band of light passing through the reflection planes 5a, 5b corresponds to λ wavelength band which is caused to be of P-polarized light by the retarder stack 7.

A retarder stack is composed of plural retardation films, and rotates the polarization direction of light of target wavelength band alone by 90° or by arbitrary angle. As a retarder stack, there is "ColorSelect" (trademark) produced by ColorLink, Inc. for example.

In the image display apparatus, the retarder stack 7 causes G (green) light to be of P-polarized light toward the respective reflection planes 5a, 5b. The polarization element 4G, which transmits the G (green) light, consists of a linear polarizing plate, which transmits P-polarized light toward the reflection planes 5a, 5b, and a quarter-wave plate.

In the image display apparatus according to the present invention, since the retarder stack 7 is provided, in the dichroic prism 5, only G (green) light component is of P-polarized light toward the reflection planes 5a, 5b, and B (blue) light and R (red) light remain of S-polarized light toward the reflection planes 5a, 5b. Therefore, in the dichroic prism 5, the reflection planes 5a, 5b efficiently reflect B (blue) light and R (red) light, and efficiently transmit G (green) light, thus the color separation property is improved.

The modulated lights, which are reflected by the spatial light modulation elements 3R, 3G and 3B and pass through the polarization elements 4R, 4G and 4B, come into the reflection planes 5a, 5b with the G (green) light being of P-polarized light toward the reflection planes 5a, 5b, and B (blue) light and R (red) light being of S-polarized lights toward the reflection planes 5a, 5b. Thus, in the dichroic prism 5, the reflection planes 5a, 5b efficiently reflect B (blue) light and R (red) light, and efficiently transmit G (green) light, thus the color composition property is improved.

Figure 6:
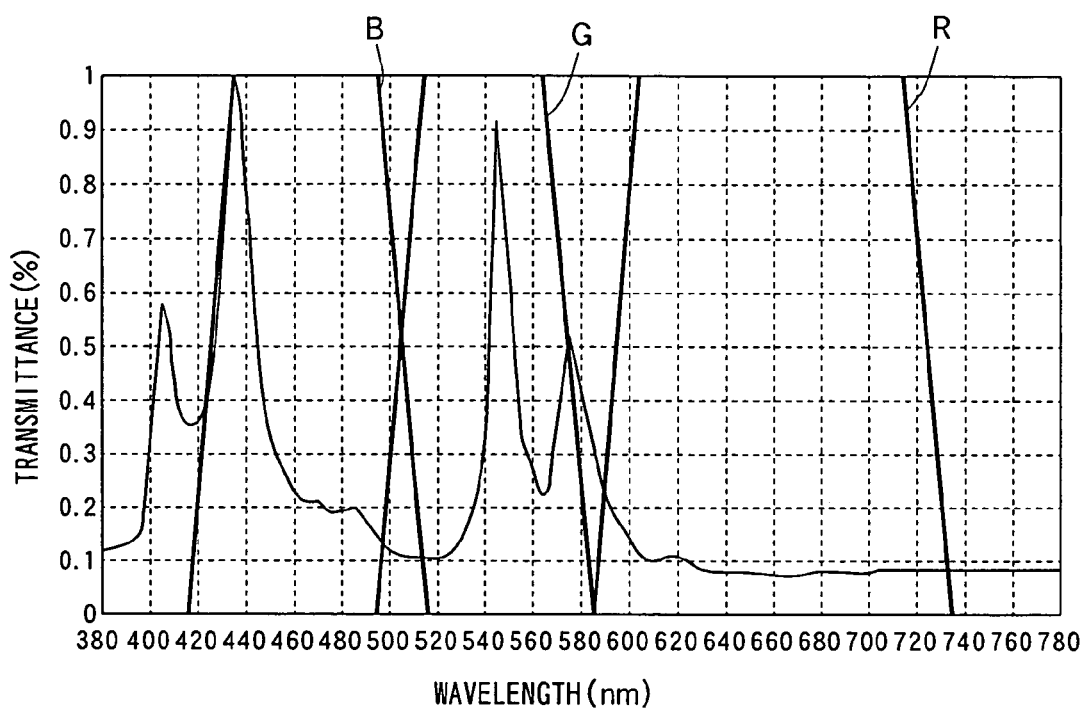
FIG. 6 shows a graph of emission spectrum of a UHP lamp used as a light source of the image display apparatus according to the present invention.
Figure 7:
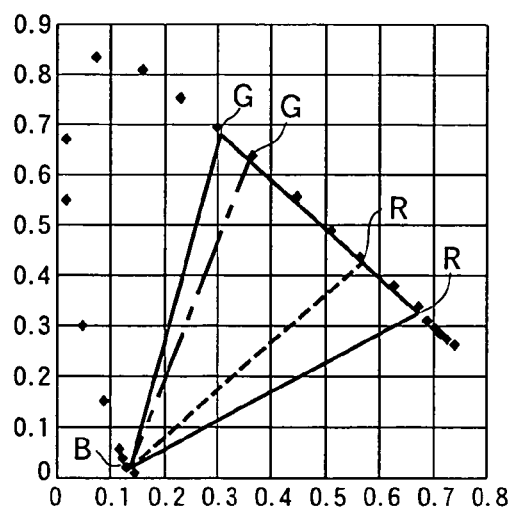
FIG. 7 shows a chromaticity diagram indicative of color reproduction property of the image display apparatus according to the present invention.

The image display apparatus according to the present invention may use a UHP lamp (ultra-high pressure mercury lamp) as a light source 1. The UHP lamp has a problem to be solved about color reproduction property of G (green) light and R (red) light after color separation. Namely, since the emission spectrum of the UHP lamp has large emission line at around 580 nm, as shown in FIG. 6, desirable color reproduction property can not be realized without cutting off light of wavelength band around 580 nm, as shown in FIG. 7. Conventional color reproduction property shown by a chain line and a dashed line in FIG. 7 indicates undesirable color separation property of G (green) light and R (red) light, respectively. By improving the color separation property of G (green) light and R (red) light, desirable color reproduction property shown by full lines in FIG. 7 can be obtained.

Figure 8:
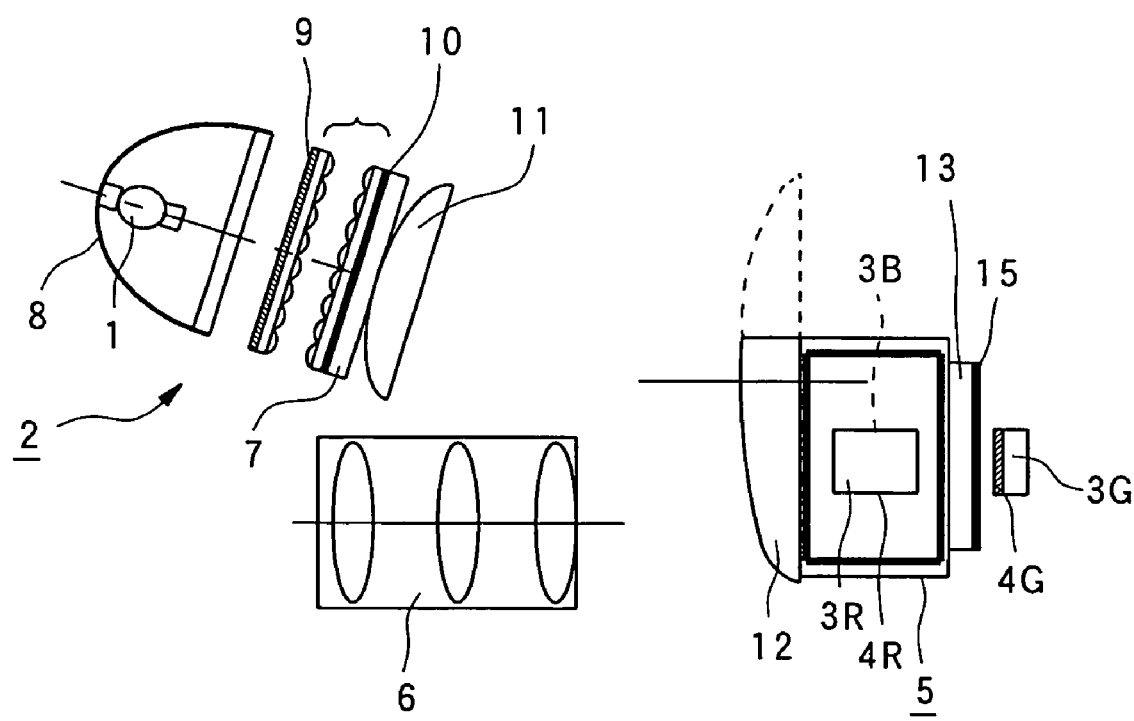
FIG. 8 shows a plan view of another example of an image display apparatus according to the present invention.

An image display apparatus employing a UHP lamp as the light source 1 uses two sets of retarder stacks 7, 13, as shown in FIGS. 8 and 9. That is, the retarder stack 7 included in the foregoing image display apparatus shown in FIG. 3 is set to be as a first retarder stack 7 which works as a first polarization change element, and a second retarder stack 13 is provided as a second polarization change element. The second retarder stack 13 is disposed on the optical path from the dichroic prism 5 to the polarization element 4G, as shown in FIG. 9.

Of the illumination light, the second retarder stack 13 rotates polarization direction of light of wavelength band which is supposed to be blocked by the polarization elements 4R, 4G and 4B alone. In the image display apparatus shown in FIG. 8, parts or components similar to those of the image display apparatus shown in FIG. 3 are indicated with the same reference numerals except the second retarder stack 13, and detailed explanation of which will be omitted.

Wavelength band of light whose polarization direction is rotated by the first retarder stack 7, shown in FIG. 10A, is wide as compared with the wavelength band of light whose polarization direction is rotated by the second reatrder stack 13, shown in FIG. 10B. For example, the first retarder stack 7 is so configured as to cause light of wavelength between 485 nm and 595 nm to be of P-polarized light toward the reflection planes 5a, 5b, and the second retarder stack 13 is so configured as to cause light of wavelength between 505 nm and 575 nm to be of S-polarized light toward the reflection planes 5a, 5b. The wavelength λ indicates an intermediate value of wavelength band at which polarization direction of light changes.

Of illumination light which passed through the first retarder stack 7, light of wavelength between 485 nm and 595 nm is caused to be of P-polarized light to pass through the reflection planes 5a, 5b of the dichroic prism 5. Light of other wavelength remains of S-polarized light to come into the reflection planes 5a, 5b, and is reflected by the reflection planes 5a, 5b of the dichroic prism 5 as R (red) light and B (blue) light respectively. Of the light of wavelength between 485 nm and 595 nm, which passed through the reflection planes 5a, 5b of the dichroic prism 5, the second retarder stack 13 rotates polarization direction of light of wavelength between 505 nm and 575 nm by 90° as shown in FIG. 10B to cause the light pass through the linear polarizing plate of the polarization element 4G. The linear polarizing plate of the polarization element 4G in this case is so configured as to transmit S-polarized light toward the reflection planes 5a, 5b of the dichroic prism 5. On the other hand, the linear polarizing plate of the polarization element 4G blocks light of wavelength between 485 nm and 505 nm as well as between 575 nm and 595 nm. Consequently, the aforementioned emission line at around 580 nm is cut off.

It is noted that the first retarder stack 7 may be disposed on anywhere on the optical path of the illumination light from the illumination optical system 2 to the dichroic prism 5. In the image display apparatus shown in FIG. 8, the first retarder stack 7 is disposed between the fly-eye lens 9 and the first condenser lens 11. The reflection-type polarizing plate 10 is disposed between the fly-eye lens 9 and the first retarder stack 7. The second retarder stack 13 is disposed between the dichroic prism 5 and the linear polarizing plate of the polarization element 4G.

Note that a circular polarizing plate 15 is provided between the second retarder stack 13 and the polarization element 4G.

The second retarder stack 13 can be so configured as to cut off only light of wavelength at around 580 nm, as shown in FIG. 11B. That is, the second retarder stack 13 is so configured as to rotate the polarization direction of light of the wavelength equal to or shorter than 575 nm by 90°. Also in this case, the linear polarizing plate of the polarization element 4G is so configured as to transmit S-polarized light toward the reflection planes 5a, 5b of the dichroic prism 5.

It should be noted that, as shown in FIG. 11A, the first retarder stack 7 causes light of wavelength between 485 nm and 595 nm to be of P-polarized light toward the reflection planes 5a, 5b, as is similar to the case shown in FIG. 10A.

This configuration can also cut off the aforementioned emission line at around 580 nm.

In the image display apparatus in FIG. 8, when transmission axes of the polarization elements 4R, 4G and 4B are rotated against polarization directions of the illumination lights, which outgo from the dichroic prism 5 to the polarization elements 4R, 4G and 4B, white balance of a display image can be adjusted.

That is, in many cases, it is necessary to reduce optical power of G (green) light to perform white balance of R (red) light, G (green) light and B (blue) light. In the case, the optical power of the G (green) light can be reduced by adjusting rotation angle of polarization direction by the second retarder stack 13 or by adjusting rotation angle of the polarization element 4G transmitting the G (green) light. For example, in the case of reducing the optical power of the G (green) light by 10%, the rotation angle of the polarization direction of the G (green) light by the second retarder stack 13 is set to be approximately 72°, or the polarization element 4G transmitting the G (green) light is rotated by approximately 18° around the optical axis. In the case of reducing the optical power of the B (blue) light by 10%, the polarization element 4B transmitting the B (light) is rotated by approximately 18° around the optical axis. Consequently, when a UHP lamp is used as the light source 1, desirable color reproduction property can be realized, as shown in FIG. 7.

Figure 12:
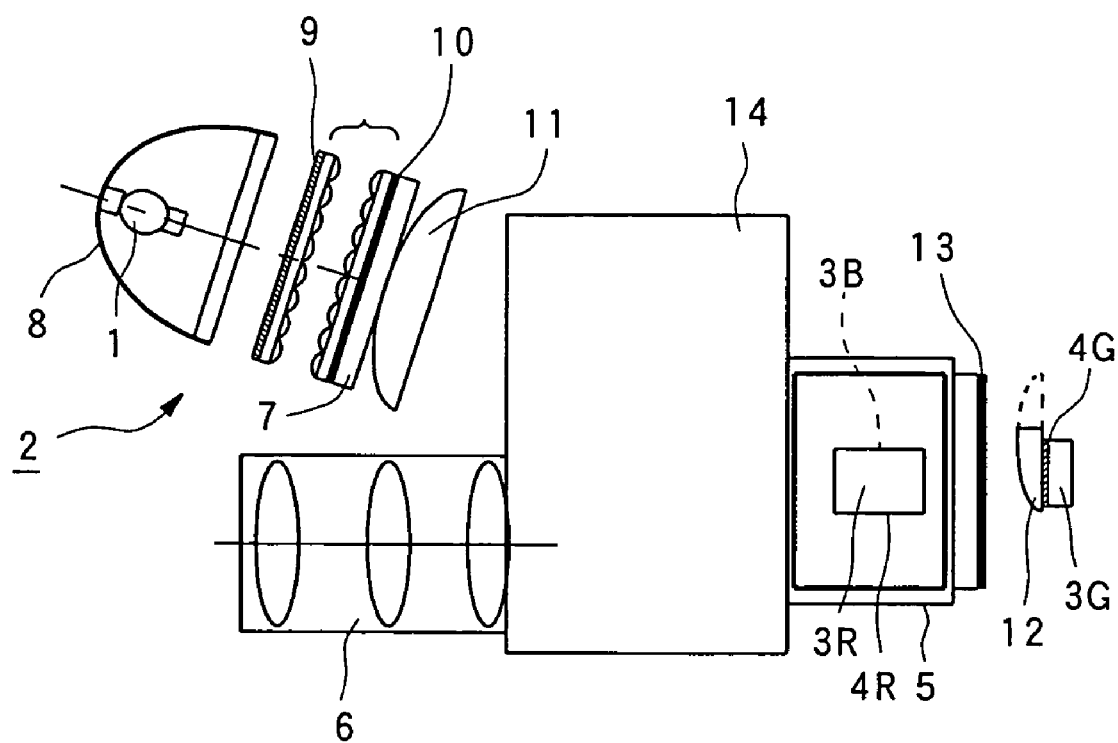
FIG. 12 shows a plan view of yet another example of an image display apparatus according to the present invention.

It is noted that in the image display apparatus according to the present invention, as shown in FIG. 12, a glass material 14 may be disposed between the illumination optical system 2 and the dichroic prism 5, as well as between the dichroic prism 5 and the projection lens 6.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative configurations or equivalents can be implemented without departing from the scope and spirit of the present invention as set forth and defined by the appended claims.

INDUSTRIAL APPLICABILITY

The present invention provides an image display apparatus including plural spatial light modulation elements and an illumination optical system illuminating the plural spatial light modulation elements, by which desirable color separation property and color reproduction property can be realized.

The invention claimed is:

1. An image display apparatus comprising:
an illumination optical system having a light source;
a plurality of spatial light modulation elements each having reflecting electrodes;
a polarization element corresponding to each of the plural spatial light modulation elements;
wherein the illumination light from the illumination optical system enters a condenser lens whose optical access is directed obliquely against the illumination light;
a color separation/composition element for color-separating illumination light from the illumination optical system into light for the respective spatial light modulation elements and for compositing reflection lights from the spatial light modulation elements, the color separation/composition element having reflection planes laid obliquely with respect to the illumination light;
a projection optical system for projecting composited light outgoing from the color separation/composition element to display an image of the respective spatial light modulation elements;
a first polarization change means for causing light of wavelength band which is supposed to pass through the reflection planes of the color separation/composition element to be of P-polarized light toward the reflection planes and causing light of wavelength band which is supposed to be reflected by the reflection planes of the color separation/composition element to be of S-polarized light toward the reflection planes, the first polarization change means being disposed in an optical path between the illumination optical system and the color separation/composition element; and
further comprising a retarder stack in the optical path between the illumination optical system and the color separation/composition element.

2. The image display apparatus according to claim 1, wherein the retarder stack rotates only a polarization direction of a certain wavelength band.

3. The image display apparatus according to claim 1, wherein transmission axes of the respective polarization elements are rotated against polarization directions of the illumination lights outgoing from the color separation/composition element to the respective polarization elements so as to adjust white balance of a display image.

4. The image display apparatus of claim 1, wherein the color separation/composition element is a dichroic prism wherein one of the light modulating elements and a corresponding polarization element is located at each of at least three side walls of the dichroic prism.

5. An image display apparatus comprising:
an illumination optical system having a light source;
a plurality of spatial light modulation elements each having reflecting electrodes;
a polarization element corresponding to each of the plural spatial light modulation elements;
a color separation/composition element for color-separating illumination light from the illumination optical system into light for the respective spatial light modulation elements and for compositing reflection lights from the spatial light modulation elements, the color separation/composition element having reflection planes laid obliquely with respect to the illumination light, and wherein the color separation/composition element is comprised of a single rectangular body;
a projection optical system for projecting composited light outgoing from the color separation/composition element to display an image of the respective spatial light modulation elements;
a first polarization change means for causing light of wavelength band which is supposed to pass through the reflection planes of the color separation/composition element to be of P-polarized light toward the reflection planes and causing light of wavelength band which is supposed to be reflected by the reflection planes of the color separation/composition element to be of S-polarized light toward the reflection planes, the first polarization change means being disposed in an optical path between the illumination optical system and the color separation/composition element; and
further comprising a retarder stack in the optical oath between the illumination optical system and the color separation/composition element.

6. The image display apparatus according to claim 5, wherein the retarder stack selectively rotates a desired polarization direction of light.

7. The image display apparatus according to claim 5, wherein transmission axes of the respective polarization elements are rotated against polarization directions of the illumination lights outgoing from the color separation/composition element to the respective polarization elements so as to adjust white balance of a display image.

8. The image display apparatus of claim 5, wherein the color separation/composition element is a dichroic prism wherein one of the light modulating elements and a corresponding polarization element is located at each of at least three side walls of the dichroic prism.

* * * * *